United States Patent
Breitsamter et al.

(10) Patent No.: US 8,387,922 B2
(45) Date of Patent: Mar. 5, 2013

(54) AERODYNAMIC ELEMENT AND WING WITH AERODYNAMIC ELEMENT, ACTUATOR-ACTIVATION MODULE, COMPUTER, COMPUTER PROGRAM AND METHOD OF INFLUENCING WAKE EDDIES

(75) Inventors: Christian Breitsamter, Landsham (DE); Alexander Allen, Ingolstadt (DE)

(73) Assignees: Airbus Operations GmbH, Hamburg (DE); Technische Universitaet Muenchen, Munich (DE)

( * ) Notice: Subject to any disclaimer, the term of this patent is extended or adjusted under 35 U.S.C. 154(b) by 831 days.

(21) Appl. No.: 12/441,325

(22) PCT Filed: Sep. 15, 2007

(86) PCT No.: PCT/EP2007/008038
§ 371 (c)(1),
(2), (4) Date: Mar. 13, 2009

(87) PCT Pub. No.: WO2008/031620
PCT Pub. Date: Mar. 20, 2008

(65) Prior Publication Data
US 2010/0006706 A1 Jan. 14, 2010

(30) Foreign Application Priority Data
Sep. 15, 2006 (DE) .................. 10 2006 043 469

(51) Int. Cl.
*B64C 23/06* (2006.01)
*G05D 1/08* (2006.01)

(52) U.S. Cl. .................. 244/199.3; 244/212; 701/3

(58) Field of Classification Search .............. 244/199.3, 244/198, 199.1, 199.2, 199.4, 212, 213, 214, 244/215, 216, 217; 701/3, 4, 1, 14, 29
See application file for complete search history.

(56) References Cited

U.S. PATENT DOCUMENTS

| | | | |
|---|---|---|---|
| 2,418,301 A * | 4/1947 | Heal | ............... 244/91 |
| 2,846,165 A | 8/1958 | Axelson | |
| 3,174,030 A | 3/1965 | Newell et al. | |
| 3,462,662 A | 8/1969 | Carpenter | |
| 3,561,326 A | 2/1971 | Cassaday | |
| 3,981,460 A | 9/1976 | Ratony | |
| 4,010,409 A | 3/1977 | Waites | |
| 4,197,655 A | 4/1980 | Moore | |
| 5,988,563 A * | 11/1999 | Allen | ............... 244/49 |

(Continued)

FOREIGN PATENT DOCUMENTS

| | | |
|---|---|---|
| DE | 21 49 956 | 4/1973 |
| DE | 202 11 664 | 1/2003 |

(Continued)

OTHER PUBLICATIONS

Russian Office Action and English language translation.
Chinese Office Action and English language translation.

Primary Examiner — Tony H. Winner
Assistant Examiner — Jacob Knutson
(74) Attorney, Agent, or Firm — Greenblum & Bernstein, P.L.C.

(57) ABSTRACT

An aerodynamic element attachable to a primary wing to extend in a longitudinal direction at an angle to a spanwise direction of the primary wing. The aerodynamic element includes a downstream end having at least two flow flaps arranged next to each other and oriented in the longitudinal direction of the aerodynamic element.

18 Claims, 15 Drawing Sheets

U.S. PATENT DOCUMENTS

| | | | |
|---|---|---|---|
| 6,082,679 A | 7/2000 | Crouch et al. | |
| 6,772,979 B2 * | 8/2004 | Kubica et al. | 244/195 |
| 2006/0043242 A1 * | 3/2006 | Benson | 244/175 |
| 2007/0271008 A1 * | 11/2007 | Ciholas et al. | 701/3 |

FOREIGN PATENT DOCUMENTS

| | | |
|---|---|---|
| GB | 850 249 | 10/1960 |
| WO | WO 99/00297 | 1/1999 |

* cited by examiner

AERODYNAMIC ELEMENT AND WING WITH AERODYNAMIC ELEMENT, ACTUATOR-ACTIVATION MODULE, COMPUTER, COMPUTER PROGRAM AND METHOD OF INFLUENCING WAKE EDDIES

CROSS-REFERENCE TO RELATED APPLICATIONS

The present application is a U.S. National Stage of International Patent Application No. PCT/EP2007/008038 filed Sep. 15, 2007 which published as WO 2008/031620 on Mar. 20, 2008, and claims priority of German Patent Application No. 10 2006 043 469.2 filed Sep. 15, 2006.

BACKGROUND OF THE INVENTION

1. Field of the Invention

The invention relates to an aerodynamic element for attachment to a wing, or a wing with a primary wing. At least one such additional aerodynamic element can also be utilized. A computer with an actuator-activation module is also provided, as well as a computer program for implementation in a computer with an actuator-activation module. A method for influencing command signals for an actuator system is also provided, as well as combinations of such a computer with an actuator-activation module, a wing and at least one actuator for purposes of destabilizing wake eddy systems, which can take place utilizing, in particular, multi-part, active flow flaps.

2. Discussion of Background Information

Aircraft produce wake eddy systems, so-called eddy trails, owing to pressure differences between the upper side of the wing with a low pressure level and the lower side of the wing with a high pressure level. As a result, air flows from the lower side of the wing to its upper side at the ends of the wing, generating an eddy (wing tip or edge eddy). In addition, fluid layers at the rear edge of the airfoil coming from the upper and lower side flow past each other in varying directions, giving rise to a free shearing layer, which is connected with the respective edge eddy in the spanwise direction. Self induction causes this free shearing layer to unfurl itself along with the respective edge eddy into two counter-rotating individual eddies, the cores of which can reach peak speeds of up to 360 km/h, depending on flight conditions or aircraft size.

The wake eddy system remains detectable up to several hundred spans downstream from the aircraft, before dissipating because of instability mechanisms and/or atmospheric effects. As a result, the eddy trail in large aircraft can last for several minutes and reach up to 30 km in length, for example. Additional high-energy eddies arise when the aircraft is in high-lift configurations, i.e., especially during takeoff and landing, with slat and trailing edge flaps deployed. In particular, the outer lateral flap edges develop additional eddies, the intensity of which can exceed that of the wing tip eddies.

Depending on the position in the eddy field, a subsequent aircraft flying into an eddy trail is exposed to an upwind field, a downwind field (loss of lift) or an induced rolling moment associated with more or less intensive speed fluctuations. This can lead to serious consequences, especially for an aircraft smaller than the aircraft flying ahead of it. These are manifested in an elevated structural dynamic load, ultimately resulting in a loss of stable attitude, for example if the planned rolling moment is no longer sufficient to compensate for the rolling moment induced by the eddy trail.

Since the strength of the two individual eddies remaining after the unfurling process is proportional to the overall circulation, and hence to the lift countering the weight of the aircraft, the safety distances between two consecutive aircraft are geared toward their maximum takeoff weight (takeoff mass).

In order to diminish the potential danger to subsequent aircraft, it is known from general prior art to influence the spatial eddy strength distribution in the wake, thereby reducing the induced rolling moment or utilizing and actuating inherent instability mechanisms in the eddy systems to make the eddy trail decay more quickly.

For example, U.S. Pat. No. 6,082,679 B1 discloses a method for selecting control parameters of an active control system for the early destruction of eddy trails by moving wing control surfaces such as ailerons and spoilers. In this solution, the near-field turbulence of the wing is determined, and an amplification mechanism is selected to change the eddy trial. Amplitudes and wavelengths of the applied eddy disruptions are then determined, and eddy wake development is simulated, while the eddy position is determined as a function of control surface displacements.

The disadvantage to such systems is that they cause an overlapping of the actual functionality, e.g., roll control, due to the use of control surfaces already present on the aircraft, like ailerons and spoilers. This multifunctionality results in a considerable extra outlay with respect to aeroelastic analysis and the flight control system.

SUMMARY OF THE INVENTION

The invention provides an aerodynamic element, as well as a wing with an aerodynamic element, an actuator-activation module, a computer, a computer program and a method for influencing wake eddies, which enable an accelerated eddy trail decay at a minimal procedural outlay.

According to the invention, an aerodynamic element is secured to a wing, which extends longitudinally at an angle to the spanwise direction of the primary wing, wherein the downstream end of the aerodynamic element accommodates at least two flow flaps situated next to each other in the longitudinal direction of the aerodynamic element.

In particular, an even or odd number of flow flaps arranged next to each other can be situated on the aerodynamic element in its longitudinal direction.

The sizes selected for at least two of the aerodynamic elements can be such that, given a phase-shifted oscillation of at least two of the flow flaps, the motion-induced aerodynamic forces generated by them measures under 10% of the maximum aerodynamic force that can be induced by one of the flow flaps at any point in time. The sizes selected for at least two of the aerodynamic elements can be such that, given an oscillation in phase opposition of at least two of the flow flaps, the motion-induced aerodynamic forces generated by these aerodynamic elements are precisely cancelled out at any point in the oscillation period.

In particular, two flow flaps can be arranged next to each other on the aerodynamic element in its longitudinal direction.

In general, the flow flaps arranged on the aerodynamic element can be directly adjacent to each other.

The flow flaps of the aerodynamic element can have allocated to them a total of at least one actuator, which can displace several or each of the flow flaps from a zero setting. In a special embodiment, at least two of the flow flaps of the aerodynamic element can here be mechanically coupled to each other, and an actuator for their activation can be coupled with these flow flaps in such a way that an activation motion of the actuator simultaneously induces phase-shifted motions of the flow flaps or motions in phase opposition. As an alternative, each of the flow flaps of the aerodynamic element can have allocated to it an actuator that can displace each of the flow flaps from a reference setting proceeding in both directions running opposite to each other.

The reference setting can be the neutral setting of the respective flow flap on the aerodynamic element, or also a setting of the respective flow flap on the aerodynamic element in which the resistance of the aerodynamic element measures at most 10% of the minimum resistance value.

The invention provides in particular that the flow flaps situated on the aerodynamic element perform flap excursions measuring between 10 and 40 degrees, preferably between 15 and 25 degrees, in both directions proceeding from the reference setting.

The aerodynamic element can be a winglet arranged at the tip of the primary wing, or arranged in the area between the root and tip of the primary wing. The angle between the longitudinal direction of the aerodynamic element and the spanwise direction of the primary wing can measure in particular 90 degrees, or range between 45 and 90 degrees.

Also provided according to the invention is a wing with a primary wing and at least one additional aerodynamic element designed based on the above characteristics. In particular, the aerodynamic element can accommodate at least one actuator for activating the at least two flow flaps in the aerodynamic element, or a respective actuator for each flow flap. In addition, the aerodynamic element can incorporate a computer for activating the at least one actuator.

Also provided according to the invention is a computer with an actuator-activation module, which generates time-variable command signals for actuators, wherein the actuator-activation module exhibits a function which, when activated, generates at least two oscillatory command signals, of which one commands a respective actuator, wherein the oscillatory command signals are in phase opposition relative to each other. The invention also provides a computer with an actuator-activation module that generates time-variable command signals for transmission to at least one actuator, wherein the actuator-activation module exhibits a function which, when activated, generates at least three oscillatory command signals to one respective actuator, of which each commands a respective actuator, wherein the oscillatory command signals are phase shifted relative to each other.

The actuator-activation module can here exhibit a function for changing the frequency and/or amplitude of the oscillatory command signal. The function for changing the frequency and/or amplitude of the oscillating command signals can exhibit a ramp function, which continuously raises or lowers the frequency and/or amplitude in a prescribed time segment.

The function for changing the frequency and/or amplitude of the oscillating command signals can alternatively or additionally exhibit a random-check generator that determines the frequency and/or amplitude for a prescribed time segment or frequencies and/or amplitudes for a prescribed time segment. The random-check generator can here also additionally determine the size of the time segment.

In general, the function for changing the frequency of the oscillating command signals can generate a white noise, and inject it into the oscillating command signal.

In the cases mentioned, the frequencies within a prescribed bandwidth can also be generated in a prescribed time segment based on a normal distribution.

Also provided according to the invention is a computer program for implementation in a computer with an actuator-activation module, which exhibits the function described above.

Also provided according to the invention is a combination of a computer with an actuator-activation module and at least one actuator for activating a flap pair, wherein the computer is designed based on one of the alternatives described above; a combination of a computer with an actuator-activation module, an aerodynamic element and at least one actuator for activating a flap pair, wherein the aerodynamic element is designed according to one of the alternatives described above; a combination of a computer with an actuator-activation module, wing and at least one actuator, wherein the wing is designed according to one of the alternatives described above.

The invention further provides a method for influencing command signals for an actuator system utilizing the following:
  Generating activation signals for an actuator;
  Changing the activation signal in such a way that at least two oscillatory command signals are generated for one respective actuator each, which are in phase opposition relative to each other.

The method according to the invention makes it possible to generate at least two oscillator command signals for each respective actuator, which are phase-shifted relative to each other.

In the method according to the invention, the frequency and/or amplitude of each oscillatory command signal can be changed before or after generating the oscillatory command signals. The frequency and/or amplitude of the oscillating command signals can here be changed by way of a ramp function, which continuously raises or lowers the frequency and/or amplitude in a prescribed time segment.

The method according to the invention also makes it possible to influence command signals by changing the frequency and/or amplitude of the oscillating command signals using a random-check generator, which determines the frequency and/or amplitude for a prescribed time segment or the frequencies and/or amplitudes for a prescribed time segment. The random-check generator can here additionally determine the size of the time segment.

In the mentioned alternatives, the function for changing the frequency and/or amplitude of the oscillating command signals in the method according to the invention can generate a white noise and inject it into the oscillating command signal.

As an alternative or in addition, the frequencies and/or the amplitudes within a prescribed bandwidth can be generated in a prescribed time segment based on a normal distribution.

The solution according to the invention generates disrupting speeds which, in comparison to uninfluenced cases, start destabilizing the primary eddies of large transport aircraft earlier, thereby accelerating the decay of eddy trails. The frequency-conditioned disruptions yield an accelerated decay, since the generated frequency-specific speed fluctuations are introduced into the primary eddy owing to the unfurling process, where they intensify the level of already existing initial disruptions, which lead to the formation of inherent instability forms, and finally cause the entire eddy system to decay.

In order to destabilize the primary eddy resulting from the process of unfurling the wake eddy system of an aircraft configuration according to the invention, control surfaces or flaps, preferably at least two flaps, are arranged on an aerodynamic element inclined relative to the wing plane, in particular on a rear edge of the aerodynamic element, e.g., in the form of a winglet.

In an especially preferred exemplary embodiment of the invention, the latter has two winglet flaps, each of which performs a motion in phase opposition. The oscillation in phase opposition of the flaps prevents a chronological change in the integral aerodynamic reactions, so that the resulting aerodynamic forces are essentially cancelled out.

In a preferred embodiment of the invention, the frequencies of the harmonic flap oscillations are adjusted to the instability forms with the highest stimulation rate that are inherent in the wake eddy system.

Flow flaps according to the invention make it possible to influence the wake eddy system without intervening in the functionality of already present control surfaces, such as ailerons or spoilers. Giving the flaps a multi-part configuration, i.e., providing several flow flaps on an aerodynamic element, ensures the constancy of overall aerodynamic correction values, which constitutes an important precondition for practical implementation with regard to the wing characteristics.

The invention also provides for an aerodynamic element attachable to a primary wing to extend in a longitudinal direction at an angle to a spanwise direction of the primary wing, wherein the aerodynamic element comprises a downstream end having at least two flow flaps arranged next to each other and oriented in the longitudinal direction of the aerodynamic element.

The at least two flow flaps may comprise an even number of flow flaps. The at least two flow flaps may comprise an add number of flow flaps.

The aerodynamic element may further comprise at least one other aerodynamic element, wherein said aerodynamic elements result in the following: given a phase-shifted oscillation of the flow flaps, motion-induced aerodynamic forces generated by the flow flaps measures under 10% of a maximum aerodynamic force that can be induced by one of the flow flaps at any point in time.

The aerodynamic element may further comprise at least one other aerodynamic element, wherein said aerodynamic elements results in the following: given an oscillation in phase opposition of the flow flaps, motion-induced aerodynamic forces generated by said aerodynamic elements are precisely cancelled out at any point in a oscillation period.

The aerodynamic element may further comprise a second aerodynamic element having at least two flow flaps arranged next to each other and oriented in a longitudinal direction of the second aerodynamic element. The flow flaps may be situated on the aerodynamic element are directly adjacent to each other. The aerodynamic element may further comprise at least one actuator configured to move one of the flow flaps from a zero setting and each flow flap from a zero setting. The flow flaps may be mechanically coupled to each other, and may further comprise an actuator coupled to the flow flaps, whereby an activation motion of the actuator simultaneously induces one of phase-shifted motions of the flow flaps and motions in phase opposition. The aerodynamic element may further comprise plural actuators each being configured to move one of the flow flaps from a reference setting, whereby each flow flap is movable in two opposite directions. The reference setting may be a neutral setting. The reference setting may be a setting that measures at most 10% of a minimum resistance value. The flow flaps may be structured and arranged to perform flap excursions measuring in both directions proceeding from a reference setting one of between 10 and 40 degrees and between 15 and 25 degrees. The aerodynamic element may be a winglet arranged at a tip of the primary wing. The aerodynamic element may be arranged in an area between a root and a tip of the primary wing. The angle may be 90 degrees. The angle may be between 45 and 90 degrees.

The invention also provides for a wing comprising an aerodynamic element of the type described above. The aerodynamic element may comprise at least one actuator for activating the at least two flow flaps. The aerodynamic element may comprise at least one actuator configured to move each of the at least two flow flaps. The aerodynamic element may comprise at least one actuator and a computer configured to activate at least one actuator.

The invention also provides for a computer comprising an actuator-activation module structured and arranged to generate time-variable command signals for actuators and utilizing a function which, when activated, generates at least two oscillatory command signals, which are in phase opposition relative to each other.

The actuator-activation module may be configured to change a frequency and/or an amplitude of the at least two oscillatory command signals. The computer may utilize a ramp function, which continuously raises or lowers the frequency and/or amplitude in a prescribed time segment. The computer may further comprise a random-check generator, which determines one of the frequency and/or the amplitude for a prescribed time segment and plural frequencies and/or plural amplitudes for a prescribed time segment. The random-check generator may additionally determine a size of the prescribed time segment. The function may generate a white nose, and inject it into the at least two oscillatory command signals. The computer may be configured to generate frequencies within a prescribed bandwidth and in a prescribed time segment based on a normal distribution.

The invention also provides for a computer program configured to be implemented on the computer of the type described above.

The invention also provides for a computer comprising an actuator-activation module structured and arranged to generate time-variable command signals for at least one actuator and exhibiting a function which, when activated, generates at least three oscillatory command signals, each of which is transmitted to the at least one actuator, wherein the at least three oscillatory command signals are phase-shifted relative to each other.

The invention also provides for a combination of the computer of described above and at least one actuator adapted to activate a pair of flaps.

The invention also provides for a combination of a computer having an actuator-activation module, at least one actuator for activating flaps, and the aerodynamic element of the type described above. The combination may further comprise a wing.

The invention also provides for a method of influencing command signals for an actuator system, wherein the method comprises generating activation signals that can be received by an actuator and changing an activation signal in such a way that at least two oscillatory command signals are generated for one respective actuator each, which are in phase opposition relative to each other.

The at least two oscillatory command signals may be phase-shifted relative to each other. The method may further comprise changing a frequency and/or an amplitude of each oscillatory command signal one of before the at least two oscillatory command signals are generated and after the at least two oscillatory command signals are generated. The method may further comprise utilizing a ramp function, which continuously raises or lowers a frequency and/or an amplitude in a prescribed time segment. The method may further comprise utilizing a random-check generator that determines one of a frequency and/or an amplitude for a prescribed time segment and plural frequencies and/or plural amplitudes for a prescribed time segment. The random-check generator may additionally determine a size of the prescribed time segment. The method may further comprise generating a white nose, and injecting it into an oscillating command signal. The method may further comprise generating frequencies and/or amplitudes within a prescribed bandwidth in a prescribed time segment based on a normal distribution.

BRIEF DESCRIPTION OF THE DRAWINGS

The invention will be described below based on the attached figures, wherein they show:

FIGS. 8 to 10 show the distributions of dimensionless axial eddy strengths for large aircraft with and without the winglet flap oscillation cancelled out given the downstream position x/b=5.6, wherein FIG. 8 shows the distributions of axial eddy strengths without winglet flap oscillation cancelled out, FIGS. 9 and 10 show the distributions of axial eddy strengths with winglet flap oscillation cancelled out, while FIG. 9 depicts the primary eddy area given winglet flaps harmonically oscillating at kA=0.2 (4 Hz), and FIG. 10 shows the primary eddy area given winglet flaps harmonically oscillating at kA=0.6 (12 Hz);

FIGS. 11 to 13 shows the results of the spectral power density distributions of the crosswind fluctuations prevailing in the primary eddy area, representative for a selected measuring point in the form of the spectral power density distributions of the crosswind fluctuations at the site of the primary eddy for large aircraft with and without the winglet flap oscillation cancelled out, wherein FIG. 11 shows a power density distribution for the reference configuration given x*=5.60, τ*=0.164; $k_A$=0, FIG. 12 shows the spectral density distribution given a cophasal excursion, and FIG. 13 shows the spectral power density distribution given an excursion with a 180 degree phase shift;

FIGS. 14 and 15 show the distribution of the relative amplitude differences AS (k; kA) between the reference case (no oscillation) and cases with oscillating winglet flaps for the power density spectra of the crosswind fluctuations determined at the site of the primary eddy of the large transport aircraft configuration, so as to illustrate the exaggerated amplitude rise, wherein FIG. 14 shows the distribution of relative amplitude differences at a flap oscillation with 0 degree phase shift, i.e., given an equidirectional excursion, and FIG. 15 shows the distribution of relative amplitude differences at a flap oscillation with 180 degree phase shift, i.e., given an inverse excursion.

DETAILED DESCRIPTION OF THE INVENTION

Figure 1:
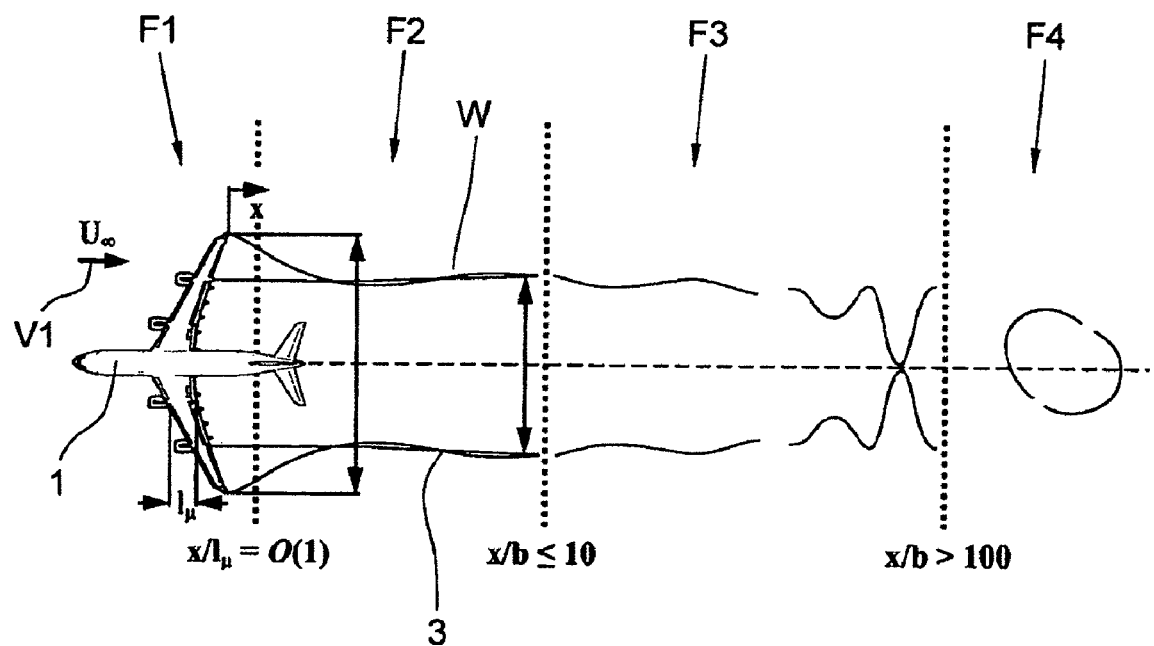
FIG. 1 shows a schematic, top view of an aircraft, with ambient air streaming around it at a speed of v1, thereby generating eddies or eddy trials W.

The invention influences the wake eddy system of aircraft, in particular larger aircraft, such as jumbo jets or transport aircraft. In particular, the eddy trail induced separation distances are reduced as a result, so that aircraft can takeoff and land at shorter time intervals. FIG. 1 shows a diagrammatic view of an aircraft 1 with ambient air flowing around it at a speed of v1, generating eddies or eddy trails W. Relative to the eddy formed by the primary wing, an expanded near field or expanded near range F2 extends behind a near field or near range F1 that extends a relatively short way behind the primary wing 2 of the aircraft 1, and is the site of an eddy formation and eddy unfurling process. Instabilities develop in a far field or far range F3 lying behind the latter in relation to the flying direction as the result of overlapping disturbances, e.g., atmospheric turbulence. The eddy W decays in a range F4: The created eddy swirls come into contact, break up and form eddy rings, which finally decay.

Primary eddies W1 form to destabilize from the unfurling process of the wake eddy system W of an aircraft or an aircraft configuration 1 consisting of at least two primary wings 2 encompassing a wingspan and a fuselage 3 (see FIG. 1).

Figure 2:
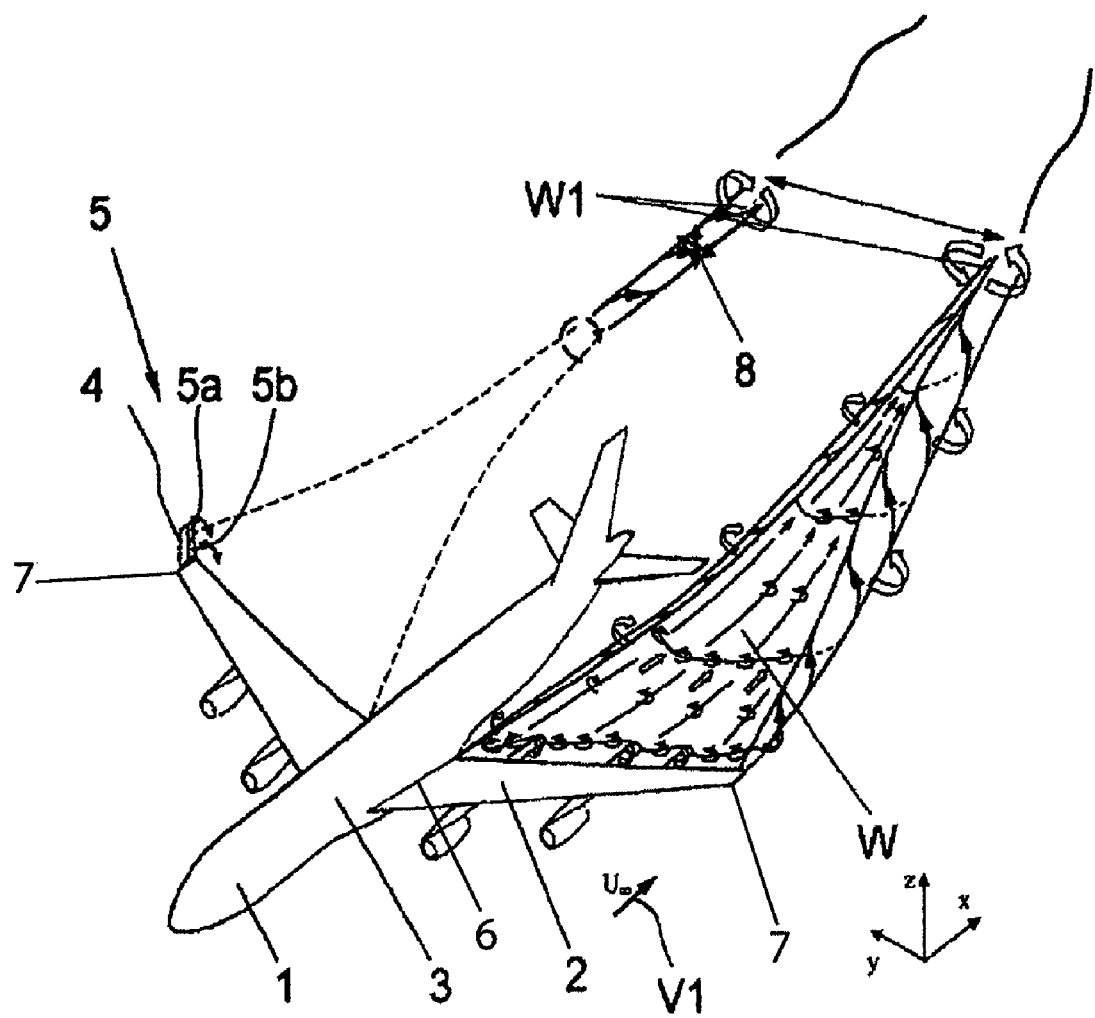
FIG. 2 shows a perspective view of an aircraft, with ambient air streaming around it at a speed of v1, thereby generating eddies or eddy trails W.

One aspect of the invention provides for an aerodynamic element to be attached to a wing, which extends in its longitudinal direction at an angle to the spanwise direction of the primary wing. According to FIG. 2, an aerodynamic element 4 in the form of a winglet 4 can be provided with two winglet flaps 5. The two winglet flaps 5 form a flap pair. According to the invention, at least two flow flaps situated one next to the other in the longitudinal direction of the aerodynamic element are arranged at the downstream end of the aerodynamic element. The flow flaps are each hinged relative to a reference plane or wing plane of the aerodynamic element.

Figure 3:
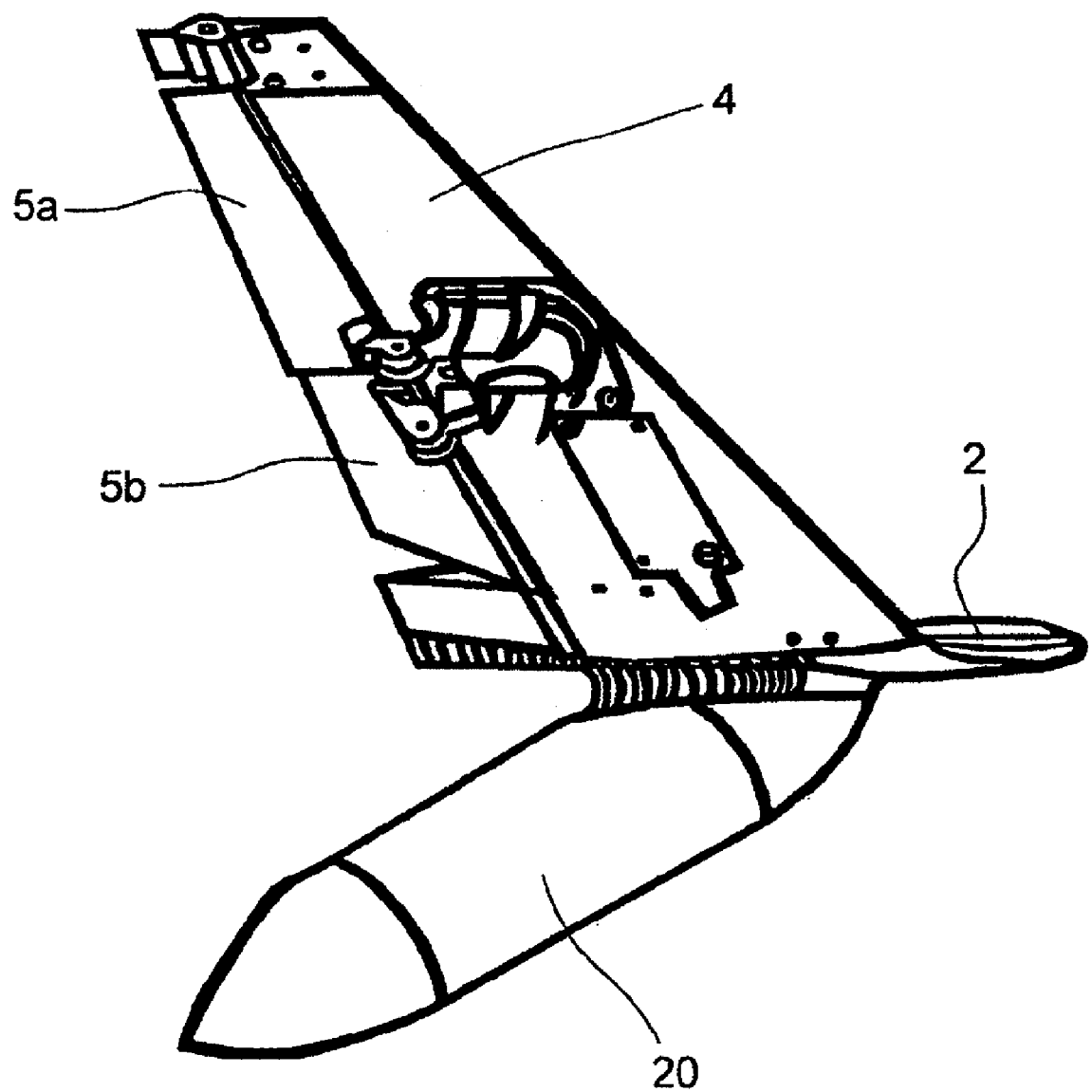
FIG. 3 shows a winglet according to the invention with two flow flaps viewed from outside in the direction toward the aircraft fuselage, each of which are allocated an actuator, as well as an optionally usable structural section, which can incorporate one or more actuators.
Figure 4:
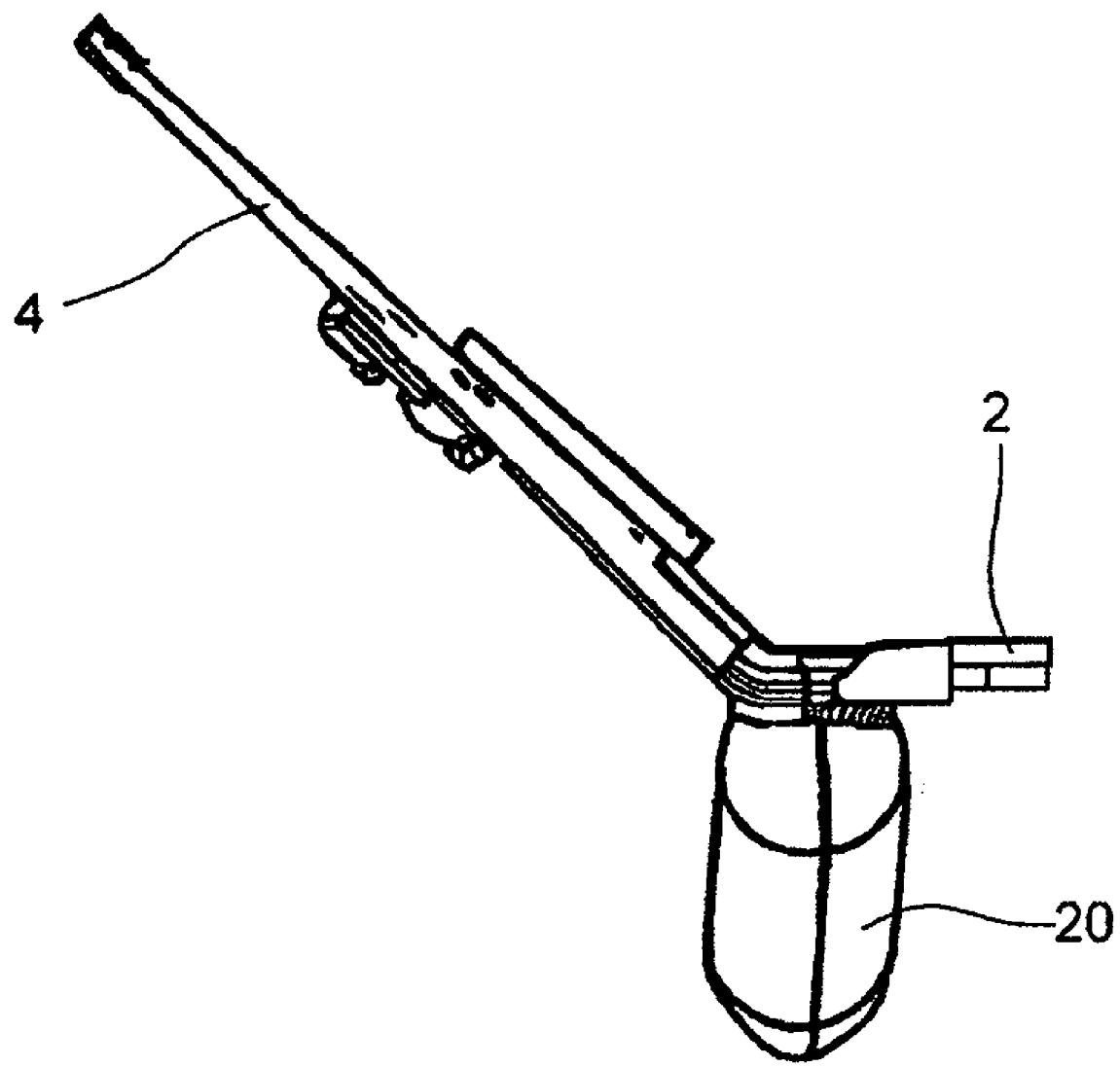
FIG. 4 shows the winglet according to FIG. 3 with the optionally usable structural section, and a section of the primary wing viewed from the front, i.e., in the incoming flow direction.
Figure 5:
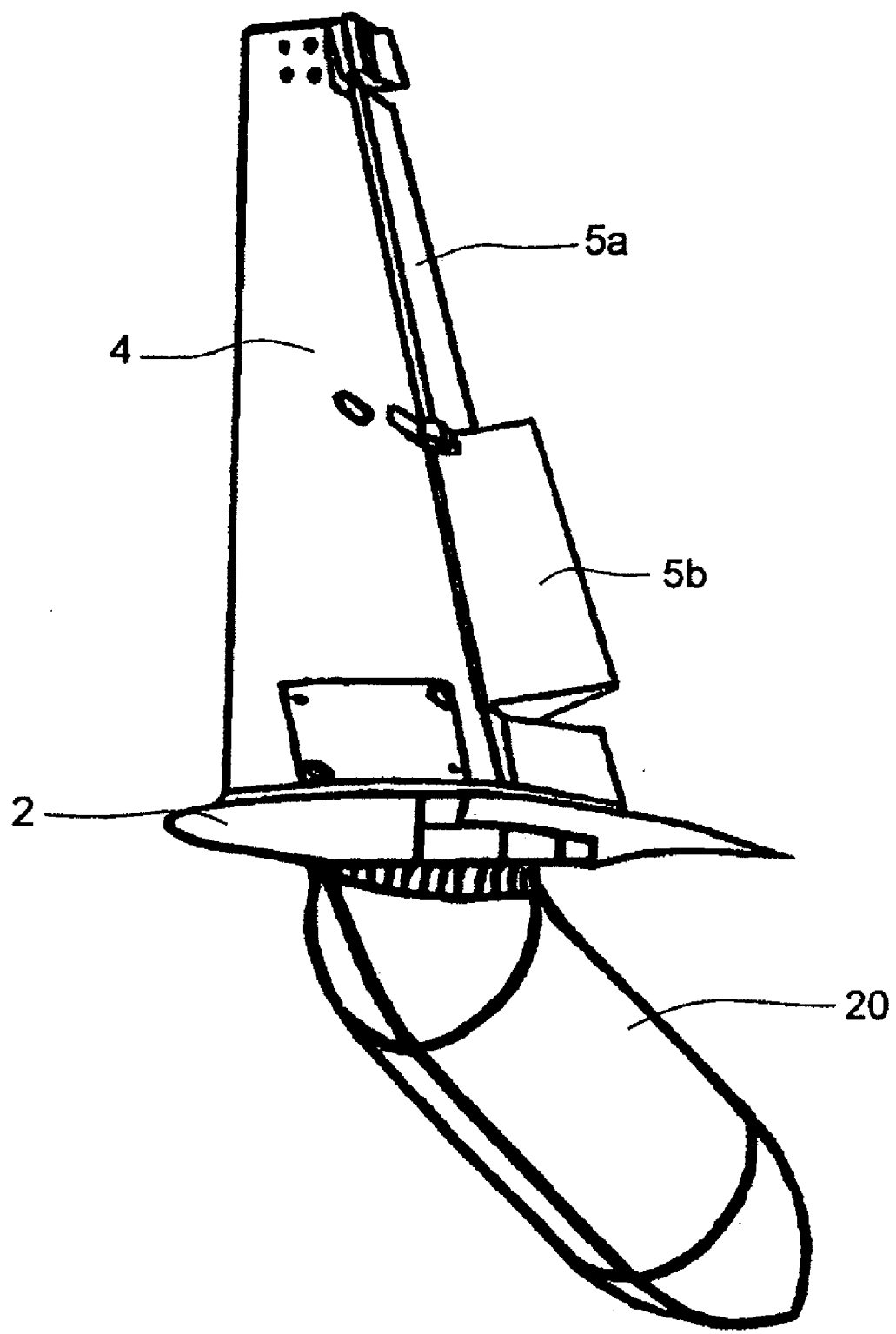
FIG. 5 shows a perspective view of the winglet according to FIG. 3.

As an example of the invention, FIGS. 3 to 5 show a winglet arranged on a wing 2, with a primary element or aerodynamic element 4 and an outer flow flap 5a and an inner flow flap 5b. A wing attachment piece optionally provides a structural section 20. In particular, the structural section can incorporate at least one actuator that activates one or both flaps. An actuator that simultaneously activates both flaps in phase opposition via a coupling device can also be provided.

Therefore, the invention in particular provides multi-part winglet flaps. These are coupled at least to an actuator or actuator system, and perform harmonic or oscillating vibrations when activated. In particular, the aerodynamic element 4 can be a winglet secured to the tip of the primary wing 1. The aerodynamic element 4 can also be a flow element arranged between the wing root 6 and the wing tip 7 (see FIG. 2), wherein the flow element can be arranged on the upper or lower side of the wing. In general, then, an aerodynamic element or flow section curved relative to the wing plane is provided.

The flow flaps that perform harmonic or oscillating vibrations according to the invention generate frequency-specific speed fluctuations during flight, which are also fed into the primary eddy owing to the unfurling process (area marked 8), where they strengthen the level of initial disruptions. This builds up inherent instability forms that finally cause the entire eddy system to decay. The frequency-conditioned disruptions yield an accelerated decay of the eddy system.

An even or odd number of flow flaps arranged next to each other can be situated on the aerodynamic element in its longitudinal direction. In particular, the sizes of at least two of the aerodynamic elements are selected in such a way that, when at least two of the flow flaps oscillate in phase opposition, the resultant motion-induced aerodynamic forces measure less than 10% of the maximum aerodynamic force inducible by one of the flow flaps at any point in time. In a preferred exemplary embodiment involving two oscillating flaps, the latter advantageously move in phase opposition, thereby largely canceling out the induced aerodynamic forces at any point in the vibration period. This greatly minimizes or even prevents a chronological change in integral aerodynamic reactions. Given an uneven number of flaps, the latter are made to oscillate in such a way as to exert the least possible or relatively low forces on the wing structure at any point in time.

The flow flaps arranged on the aerodynamic element can vary in configuration, e.g., be arranged directly adjacent to each other, i.e., without a structural section lying being interspersed between the flow flaps. As an alternative, a structural section can also lie between the flow flaps.

The flow flaps of the aerodynamic element can have allocated to them at least one actuator, which can adjust several or each of the flow flaps from a zero setting. This means that several, and at least two, of the flow flaps of the aerodynamic element are mechanically coupled with each other, and that an actuator is coupled with these flow flaps for their activation, e.g., by way of a coupling device and/or a gearbox, in such a way that an activation motion of the actuator simultaneously induces phase-shifted motions of the flow flaps or motions in phase opposition. In particular, each of the flow flaps of the aerodynamic element can have allocated to it a respective actuator, which can adjust each of the flow flaps from a reference setting proceeding in both directions running opposite to each other.

The reference setting can generally be understood as the neutral setting of the respective flow flap on the aerodynamic element, or a setting of the respective flow flap on the aerodynamic element in which the resistance of the aerodynamic element measures at most 10% of the minimum resistance value. This dimension applies to cases where the other flow flaps are not activated, i.e., remain unchanged. The flow flaps arranged on the aerodynamic element are provided with flap excursions proceeding from the reference setting of between 10 and 40 degrees, preferably between 15 and 25 degrees, in both directions.

Therefore, the aerodynamic element can be a winglet situated at the tip of the primary wing, or be arranged in the area between the root and tip of the primary wing, and the angle between the longitudinal direction of the aerodynamic element and the spanwise direction of the primary wing can measure 90 degrees, or range between 45 and 90 degrees.

The aerodynamic element can accommodate at least one actuator for activating the at least two flow flaps, or the aerodynamic element can accommodate one respective actuator for activating the at least two flow flaps. As an alternative or in addition, the aerodynamic element can incorporate a computer for activating the at least one actuator.

The invention can also provide a computer with an actuator-activation module, which generates time-variable command signals for actuators, wherein the actuator-activation module exhibits a function which, when activated, generates at least two oscillatory command signals for one respective actuator, which are in phase opposition relative to each other. There can also be a function which, when activated, generates at least three oscillatory command signals, each of which is to be transmitted to a respective actuator, wherein the oscillatory command signals are phase-shifted relative to each other.

In these cases, a function for changing the frequency and/or amplitude of the oscillatory command signal can be implemented in the computer, which can cumulatively or alternatively exhibit:

A ramp function that continuously raises or lowers the amplitude in a prescribed time segment;

A random-check generator, which determines the frequency and/or amplitude for a prescribed time segment, or the frequencies and/or amplitudes for a prescribed time segment, wherein the random-check generator can additionally determine the size of the time segment;

A generator for producing a white noise.

In particular, these functions can be incorporated in the oscillating command signal.

The computer can generate the frequencies within a prescribed bandwidth in a prescribed time segment based on a normal distribution.

The mentioned functions can also be provided as a computer program for implementation in a computer with an actuator-activation module.

Also provided is a method for influencing command signals for an actuator system with the following:

Generating activation signals for an actuator;

Changing the activation signals in such a way as to generate at least two oscillatory command signals for a respective actuator, which are in phase opposition relative to each other.

At least two oscillatory command signals can here be generated for a respective actuator, which are phase-shifted relative to each other. The frequency and/or amplitude of each oscillatory command signal can also be changed before or after generating the oscillatory command signals. In particular, the frequency and/or amplitude of the oscillating command signals can be changed by way of a ramp function, which continuously raises or lowers the frequency and/or amplitude in a prescribed time segment.

The functions specified in the description of the computer according to the invention can be provided in the method according to the invention.

The frequencies of the oscillating vibrations provided according to the invention are advantageously determined experimentally, so that the frequencies and/or amplitudes used in the invention can be used according to the invention. The determination of frequencies and/or amplitudes will be described below.

The frequencies of the harmonic or oscillating flap vibrations are adjusted to the instability forms with the highest stimulation rate that are inherent in the wake eddy system. These frequencies can be experimentally determined, so as to activate or operate the actuator allocated to the flow flaps with the corresponding frequencies.

Figure 6:
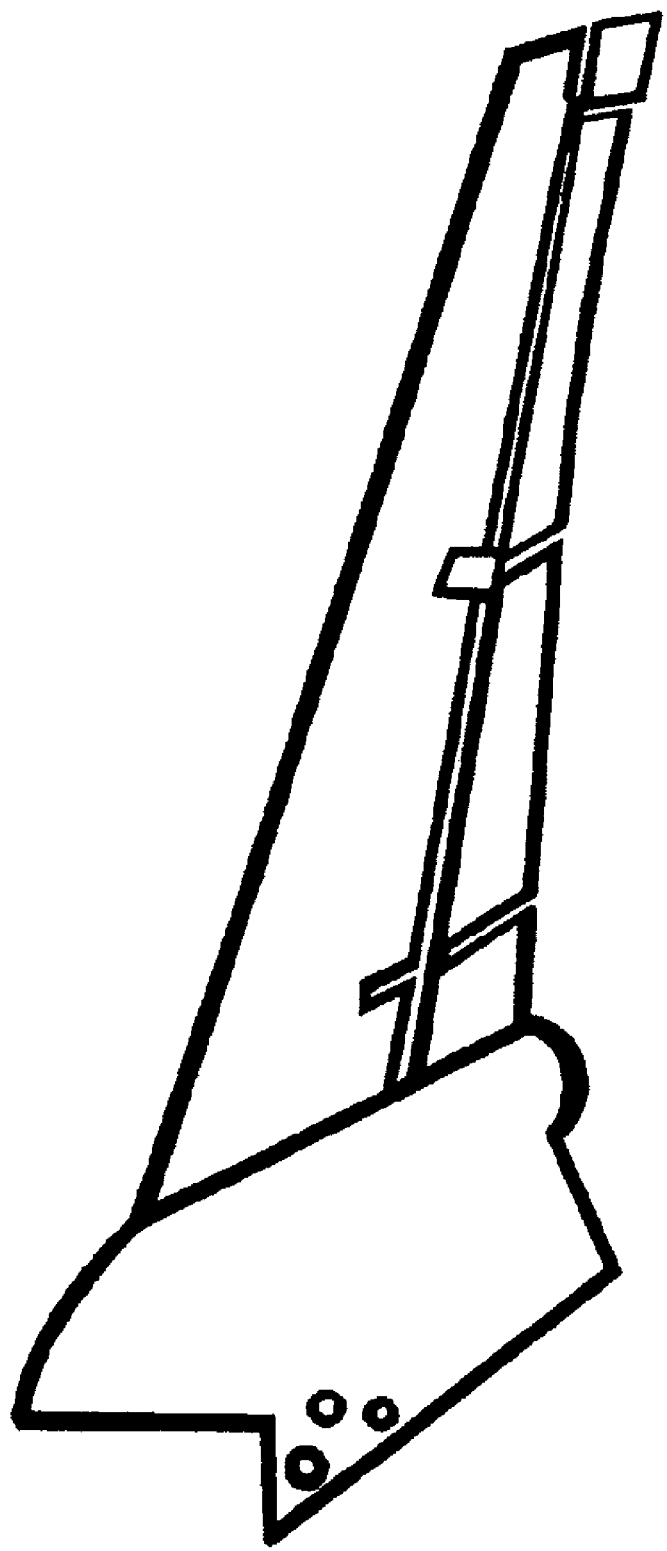
FIG. 6 shows a winglet model for performing studies on eddy strength distributions given a typical configuration of a large aircraft, and in particular transport aircraft, with electromotor flap activation correspondingly outfitted with measuring instrumentation.
Figure 7:
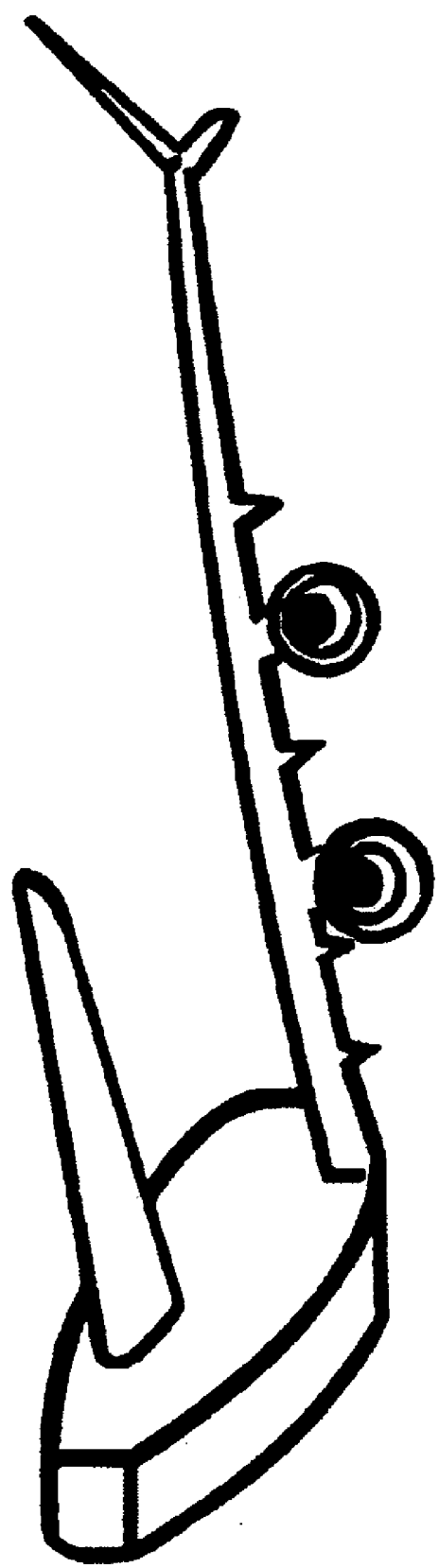
FIG. 7 shows the winglet of FIG. 6 along with a wing model that accommodates the winglet.
Figure 8:
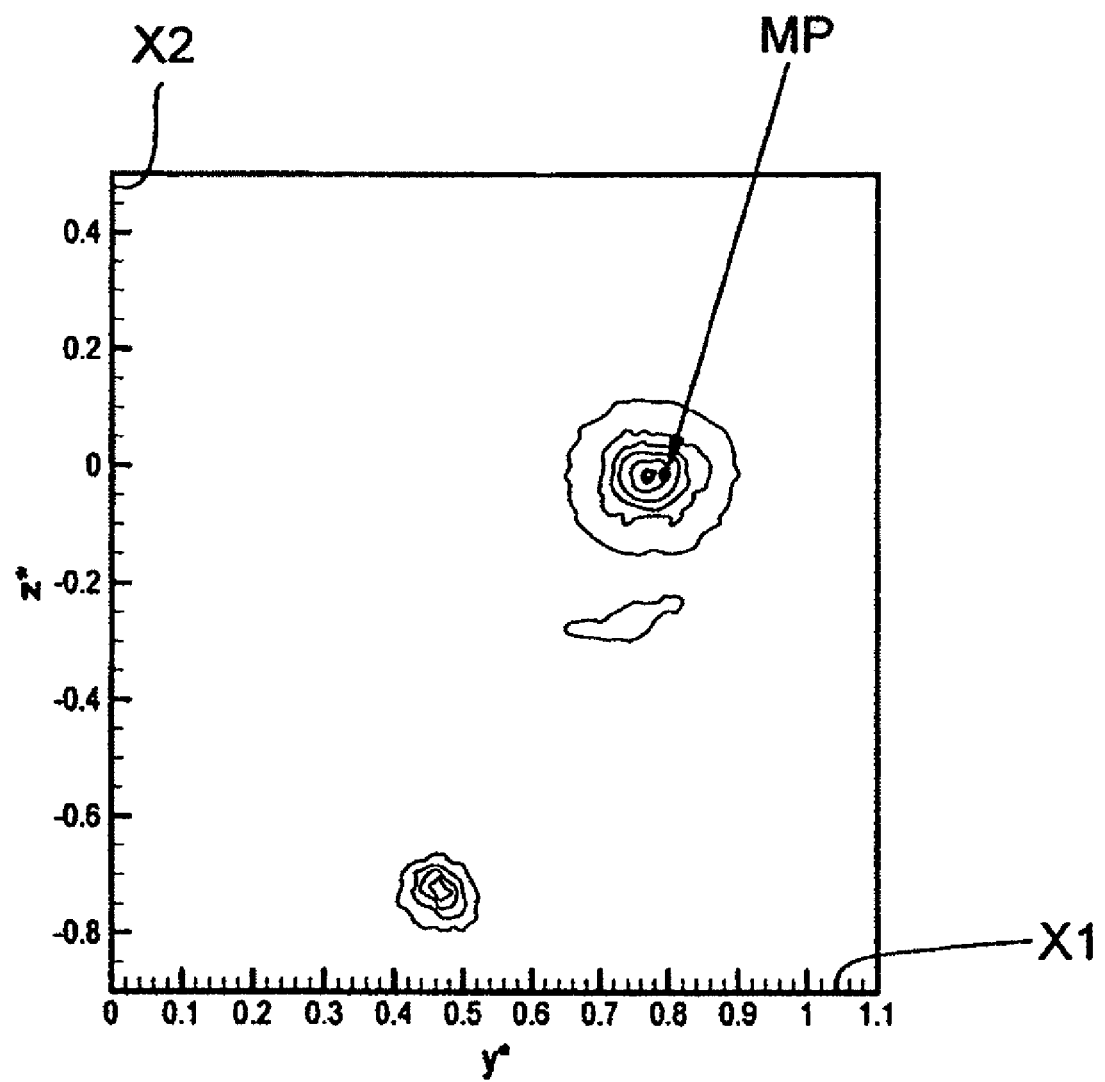
Figure 9:
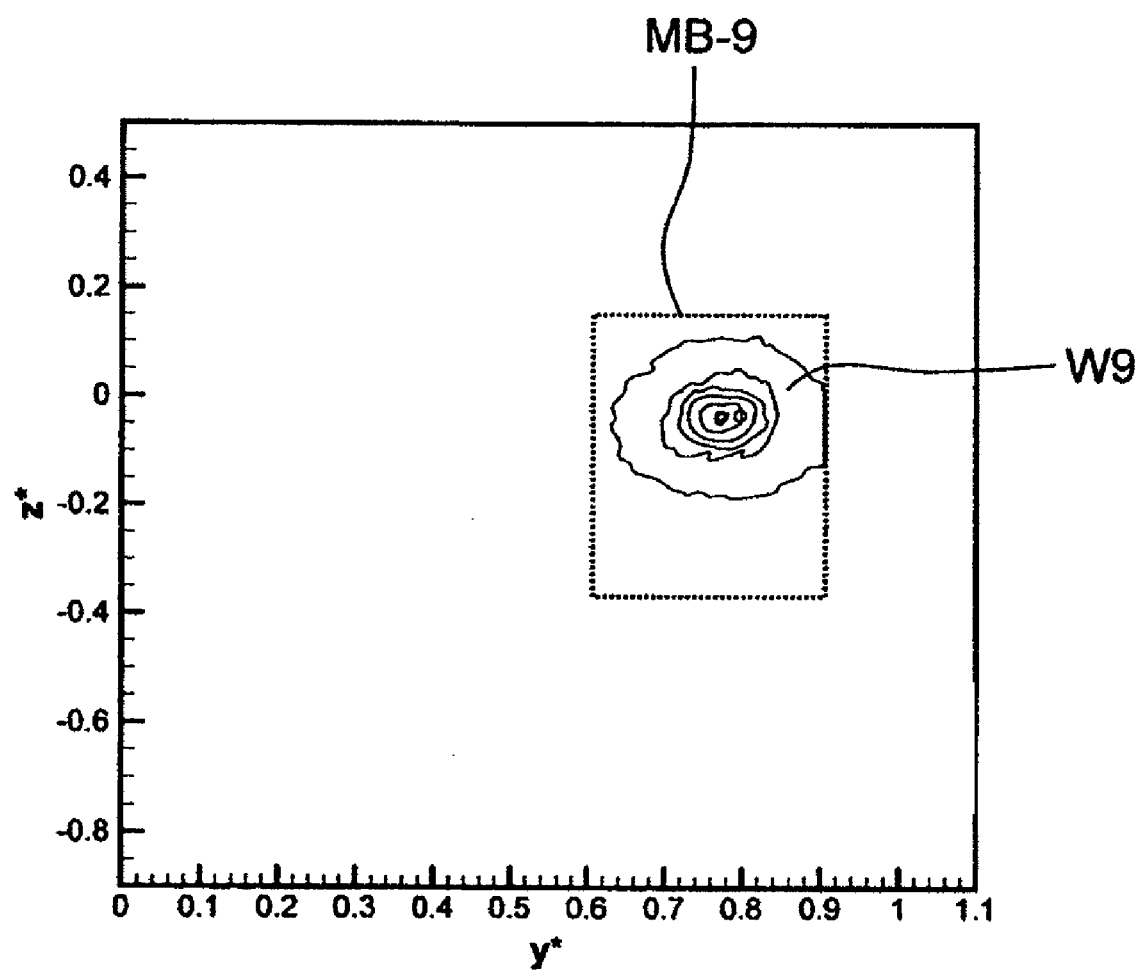
Figure 10:
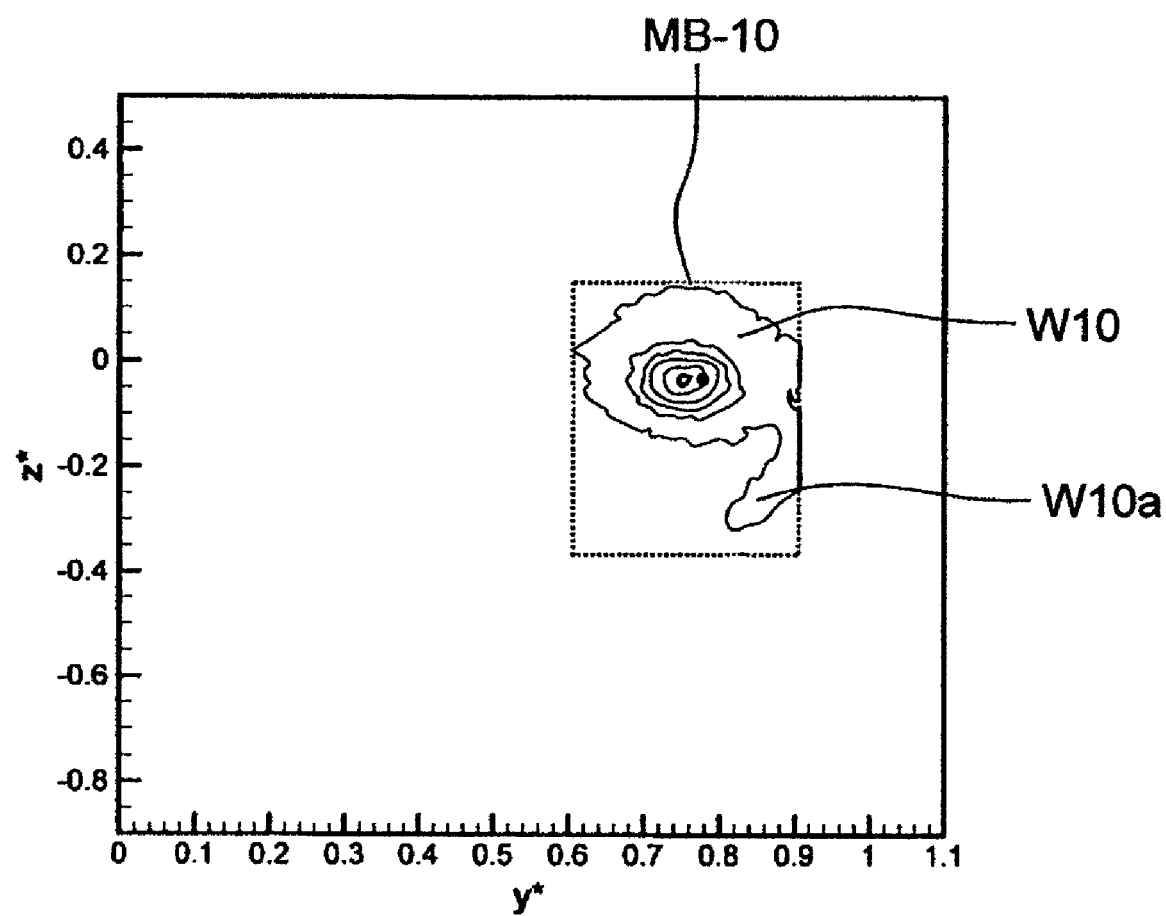

A flow element outfitted with electromotor flap control and corresponding instrumentation can be used in order to perform studies on a model of a typical large transport aircraft configuration, a flow element or winglet, or a combination of a primary wing with a flow element. FIGS. 6 and 7 depict such a model of a wing with a winglet or a winglet. The flap sizes of a flow element with two flaps, for example, can be selected in such a way as to precisely cancel out the motion-induced aerodynamic forces during oscillation in phase opposition at any point in the oscillation period. In such a model, space considerations make it preferably that the drive be located in an external casing at the wing tip. In particular scale measurements can be performed to check the constancy of aerodynamic correction values. The maximum possible flap excursions of the inner and outer flap each measure ±20° for the model test, for example. The vibration frequency can be set within a range of 0 to 100 Hz. The influence exerted on the eddies as the stream moves over the flow element or wing with a flow element is here aimed at the resultant energy-rich wing tip eddy, which is exposed to fluctuations frequency-conditioned by the flap motion, so as to introduce an elevated stimulation of instability forms downstream during interaction and merging with the other dominating individual eddies (flap eddies and propulsion system pod eddies). FIGS. 8 to 15 depict the distributions of chronologically averaged, dimensionless axial eddy strengths in the furthest downstream wake plane observed at 5.6 spans. FIGS. 8 to 10 represent the distributions of the dimensionless axial eddy strengths for the configuration of large aircraft with and without the winglet flap oscillation cancelled out given the downstream position x/b=5.6. FIG. 8 shows a diagram in which the axial eddy strengths are plotted on the X1 axis, while the distribution of power densities is plotted on the X2 axis. FIG. 8 shows the reference case, i.e., excluding active influences caused by flap motions. The power spectrum of the labeled measuring point shown on FIG. 8 is depicted on FIGS. 11 to 13. FIG. 9 shows the primary eddy W9 of a measuring range MB9 for the winglet flaps harmonically oscillating at kA=0.2 (4 Hz), while FIG. 10 shows the primary eddy W10 of a measuring range MB10, along with the wing tip eddy W10a for the winglet flaps harmonically oscillating at kA=0.6 (12 Hz). The cases involving oscillating flaps present a distribution structure similar to the reference case in terms of chronological average values, and comparable peak values. However, closer examination already reveals a variation in the relative span position of the primary eddy measuring 3 to 4%, along with topological differences.

Figure 11:
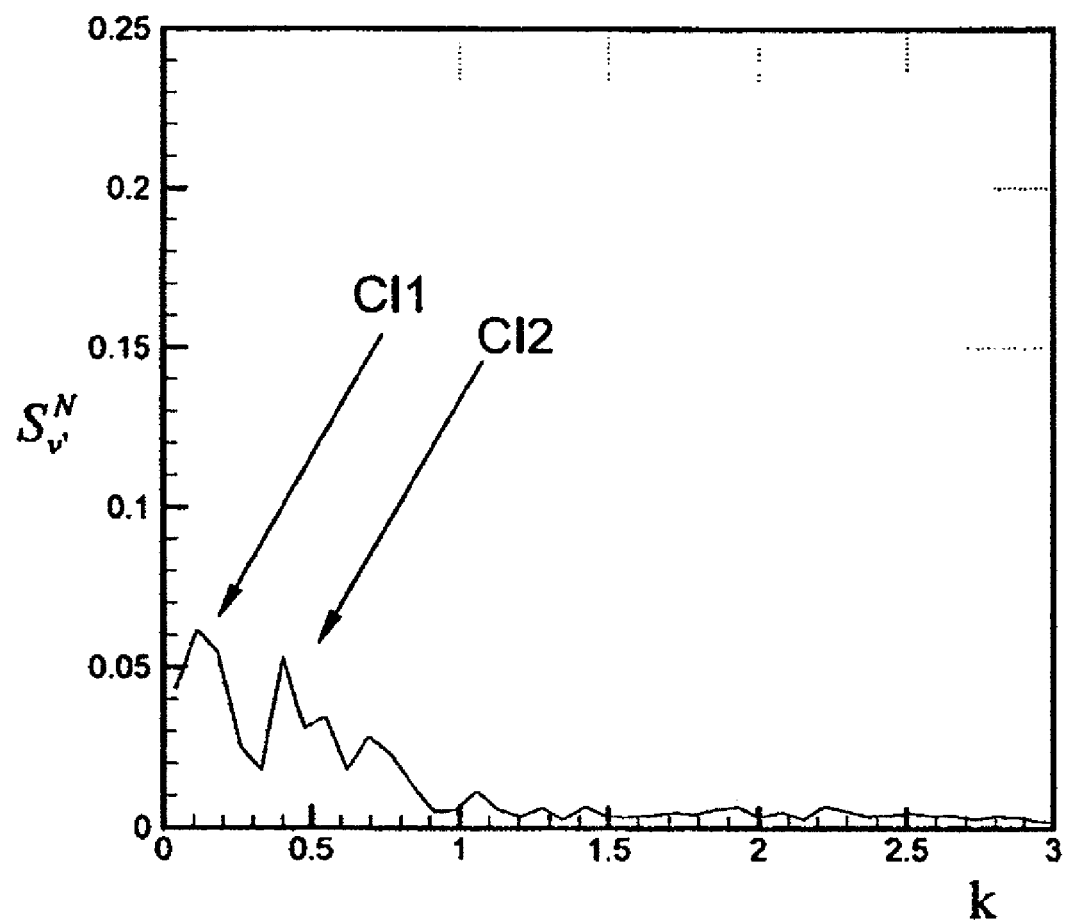
Figure 12:
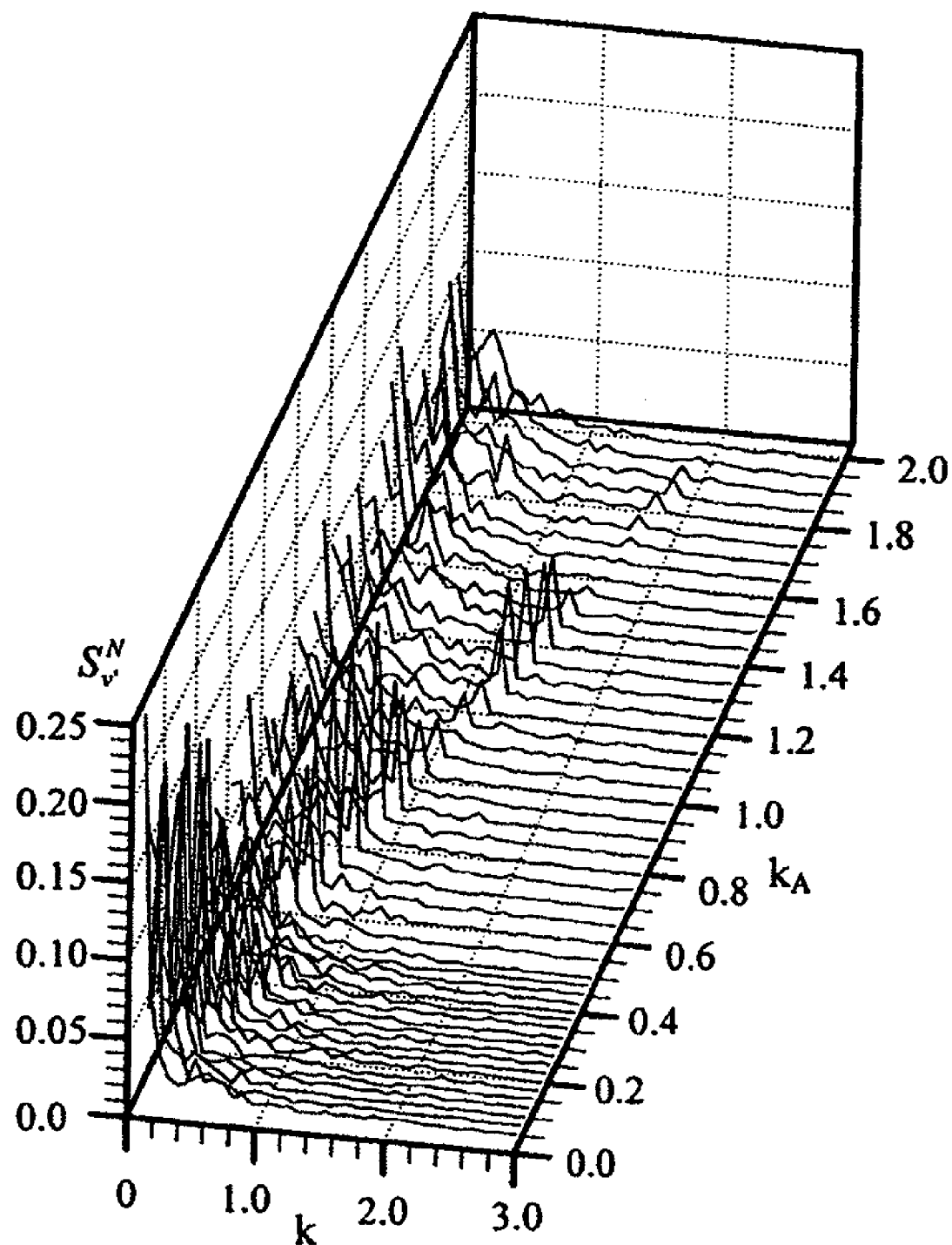
Figure 13:
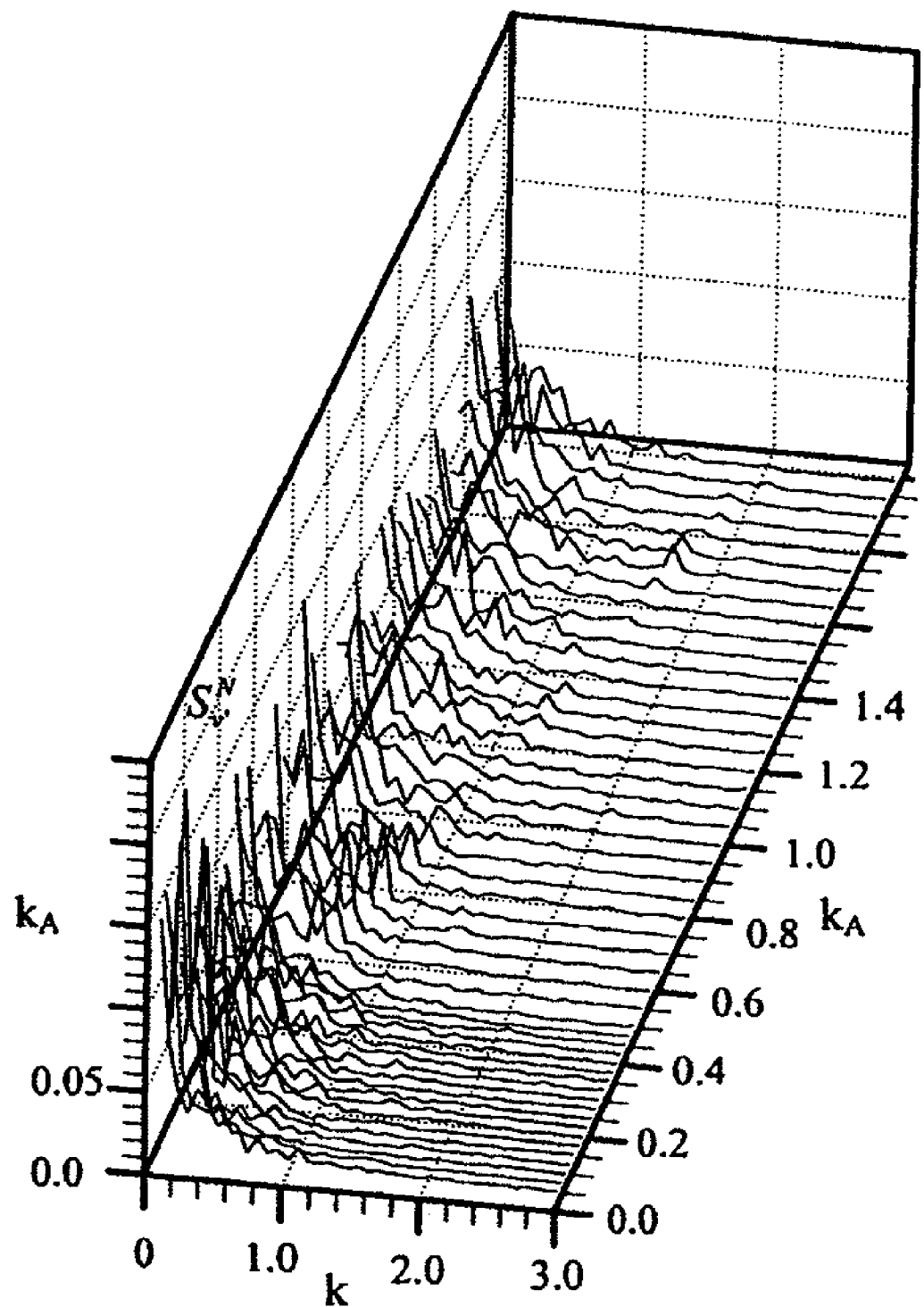

FIGS. 11 to 13 present the results of the spectral power density distributions of the crosswind fluctuations prevailing in the primary eddy area, representative for a selected measuring point. In the reference case, exaggerated amplitude rises become evident in the area of reduced frequencies for the so-called Crow instability CI1 and so-called Crouch instability CI2 (FIG. 11 with reference configuration; x*=5.60, τ*=0.164; $k_A$=0). The activation of the oscillating winglet flap is manifested in a considerable frequency-specific introduction of energy, as evident from the histograms showing the power density spectra on FIGS. 12 and 13 given a variation in excitation frequency kA. FIG. 12 shows the power spectrum given a cophasal excursion, while FIG. 13 shows the power spectrum given flaps with a 180 degree phase shift. This means that the harmonic speed changes generated in the winglet wake also act on the speed fluctuations in the primary eddy area via induction. The power values along the diagonals k=kA here denote the energy introduced at the respective excitation frequency. The oscillating wake also results in significant exaggerated amplitude rises allocated to the instability forms, predominantly in the frequency ranges.

Figure 14:
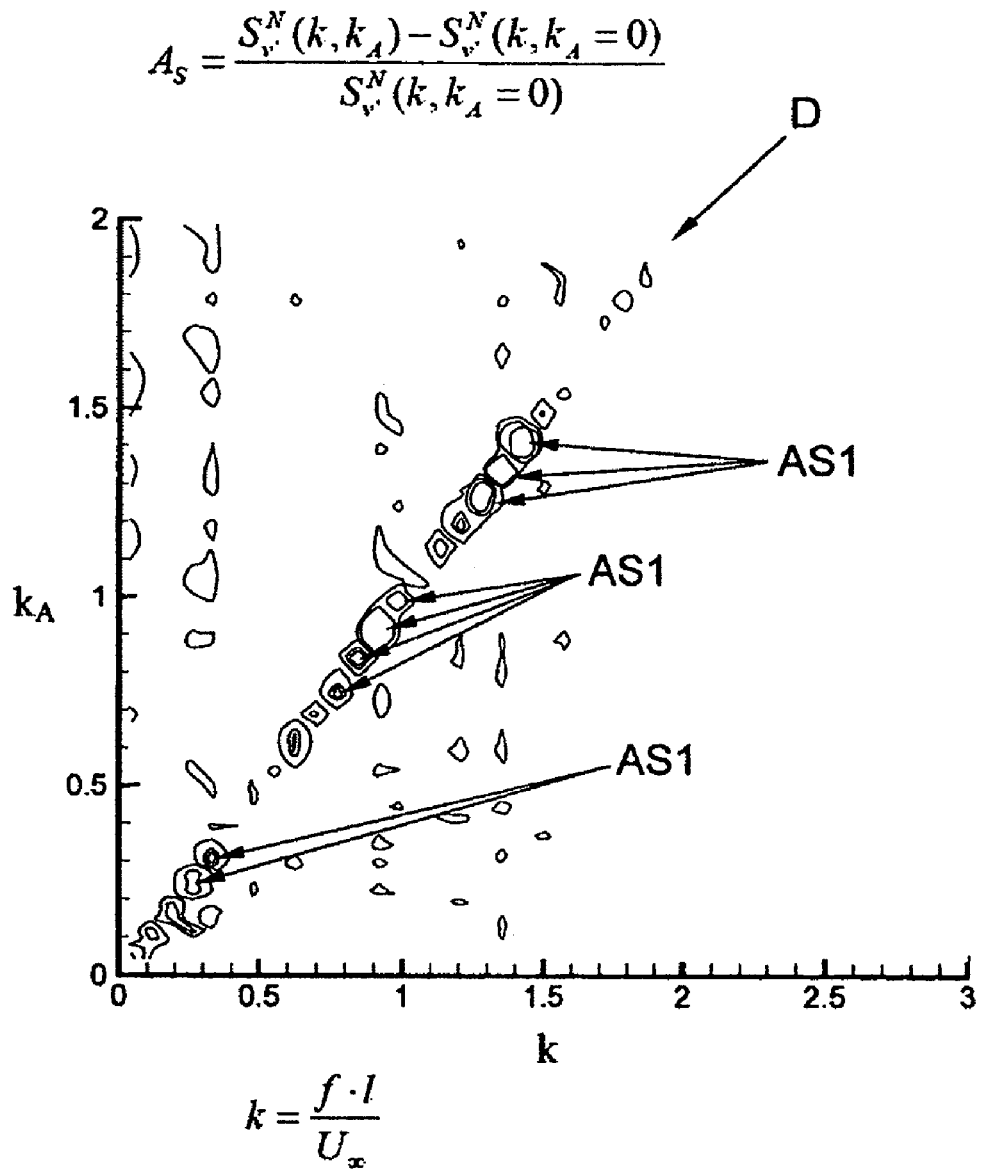
Figure 15:
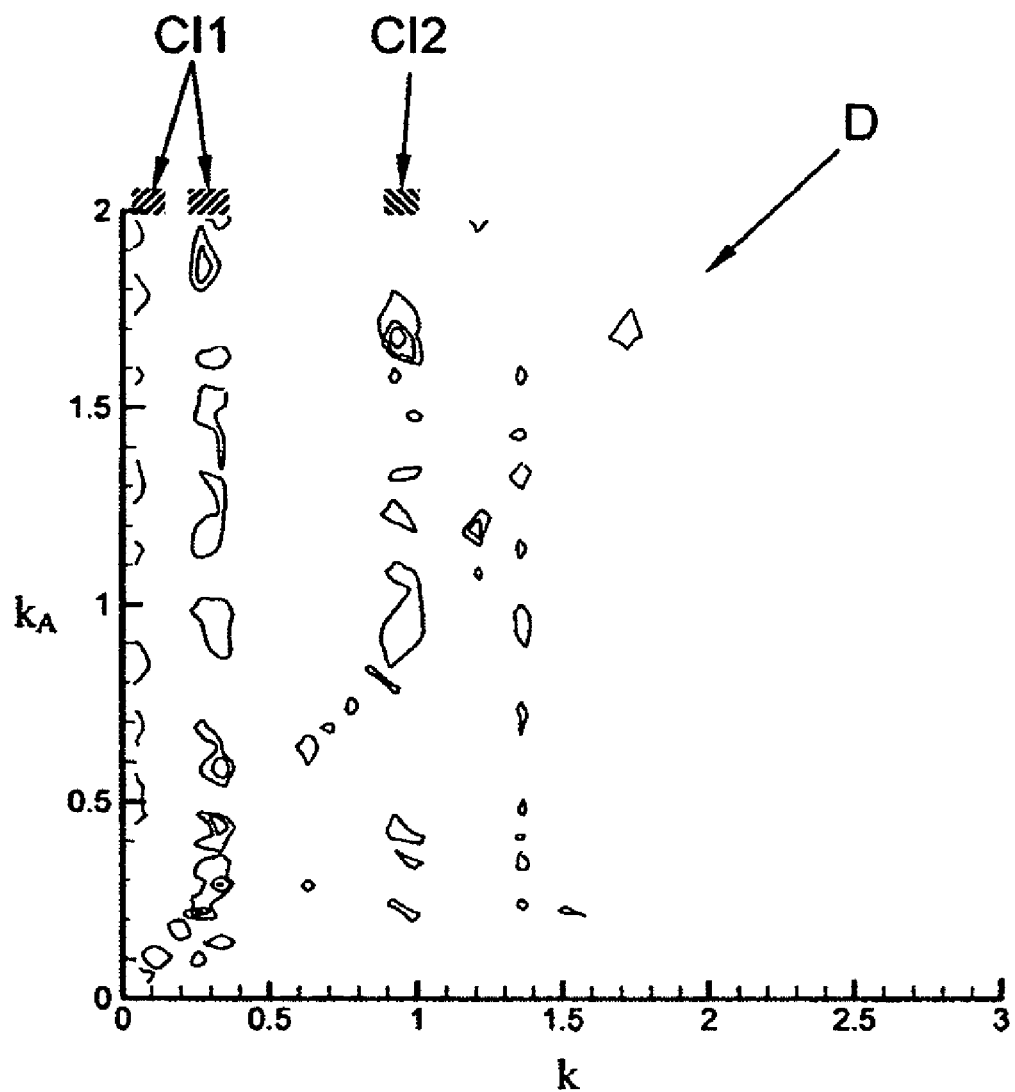

In order to illustrate the exaggerated amplitude rises, an evaluation is performed on the relative difference in spectral power density distributions is between cases with oscillation and the reference case without flap vibration. FIGS. 14 and 15 present this evaluation. The results obtained for the equidirectional excursion reveal amplitude differences with peak values k=kA of up to 20 along the diagonal (direction D), which are categorized into characteristic groups of local maxims based on the excitation of instability forms. The opposite excursion reflects these trends on a weakened scale. However, distinct exaggerated amplitude rises of AS=2-4 arise over a broad frequency range of excitation for specific bands k=constant at the AS1 locations.

Local maxims provide information about the reduced frequency values with particularly exaggerated amplitude rises, thereby corroborating the potential of an active excitation of inherent instabilities.

The invention claimed is:

1. An aerodynamic element attachable to a primary wing of an aircraft to extend in a longitudinal direction at an angle to a spanwise direction of the primary wing, the aerodynamic element comprising:
a downstream end having at least two flow flaps arranged next to each other and oriented in the longitudinal direction of the aerodynamic element,
wherein the aerodynamic element is configured to produce an oscillation of the at least two flow flaps to generate motion-induced aerodynamic forces with frequencies associated with inherent wake eddy instabilities of the aircraft.

2. The aerodynamic element of claim 1, wherein the at least two flow flaps comprises an even number of flow flaps.

3. The aerodynamic element of claim 1, wherein the at least two flow flaps comprises an odd number of flow flaps.

4. The aerodynamic element of claim 1, wherein said aerodynamic element is configured to produce a phase-shifted oscillation of the flow flaps, such that motion-induced aerodynamic forces generated by the flow flaps measures under 10% of a maximum aerodynamic force that can be induced by one of the flow flaps at any point in time.

5. The aerodynamic element of claim 1, wherein said aerodynamic element is configured to produce an oscillation in phase opposition of the flow flaps, motion-induced aerodynamic forces generated by said aerodynamic elements are precisely cancelled out at any point in an oscillation period.

6. The aerodynamic element of claim 1, wherein the flow flaps situated on the aerodynamic element are directly adjacent to each other.

7. The aerodynamic element of claim 1, further comprising at least one actuator configured to move one of:
the flow flaps from a zero setting; and
each flow flap from a zero setting.

8. The aerodynamic element of claim 1, wherein the flow flaps are mechanically coupled to each other, and further comprising an actuator coupled to the flow flaps, whereby an activation motion of the actuator simultaneously induces one of phase-shifted motions of the flow flaps and motions in phase opposition.

9. The aerodynamic element of claim 1, further comprising one or more actuators, each of the one or more actuators being configured to move one of the flow flaps from a reference setting, whereby each flow flap is movable in two opposite directions.

10. The aerodynamic element of claim 9, wherein the reference setting is a setting that measures at most 10% of a minimum aerodynamic resistance value.

11. The aerodynamic element of claim 9, wherein the flow flaps are structured and arranged to perform flap excursions measuring in both directions proceeding from a reference setting between 10 and 40 degrees.

12. The aerodynamic element of claim 1, wherein the aerodynamic element is a winglet arranged at a tip of the primary wing.

13. The aerodynamic element of claim 1, wherein the aerodynamic element is arranged in an area between a root and a tip of the primary wing.

14. The aerodynamic element of claim 1, wherein the angle is 90 degrees.

15. The aerodynamic element of claim 1, wherein the angle is between 45 and 90 degrees.

16. A primary wing comprising an aerodynamic element of claim 1.

17. The wing of claim 16, wherein the aerodynamic element comprises at least one actuator for activating the at least two flow flaps.

18. The wing of claim 16, wherein the aerodynamic element comprises at least one actuator and a computer configured to activate the at least one actuator.

* * * * *